W. H. KRETSINGER.
Rake.
No. 201,254. Patented March 12, 1878.
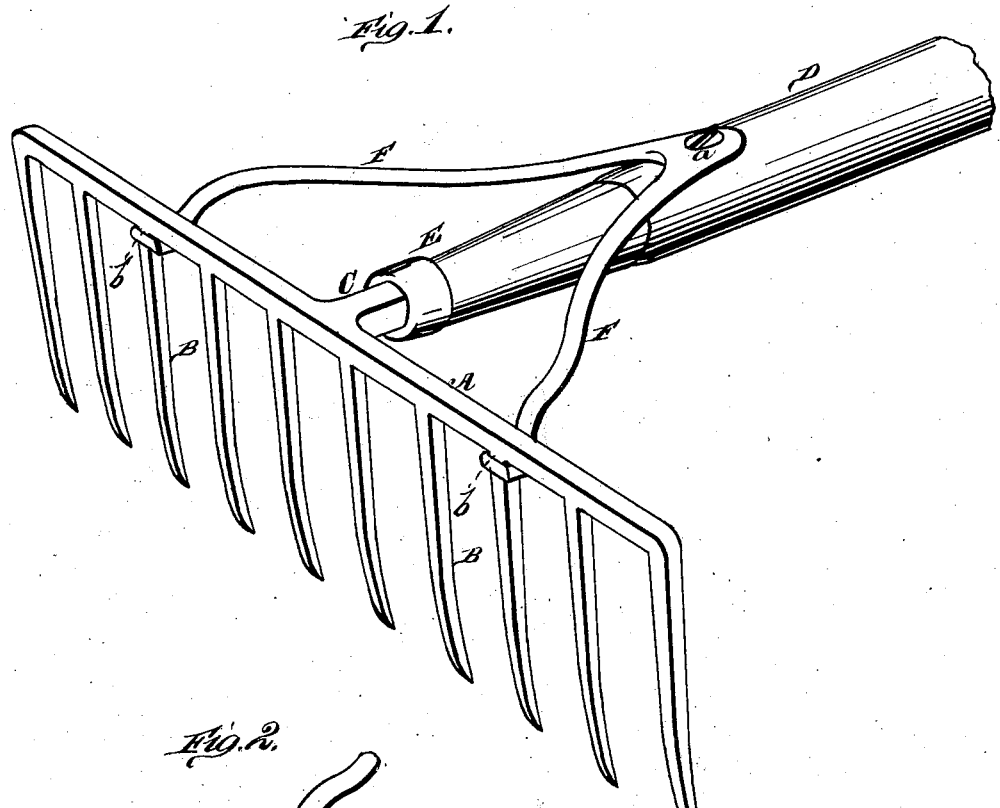
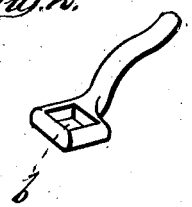
WITNESSES
INVENTOR
Wm. H. Kretsinger.
ATTORNEYS.

UNITED STATES PATENT OFFICE.

WILLIAM H. KRETSINGER, OF FORT MADISON, IOWA.

IMPROVEMENT IN RAKES.

Specification forming part of Letters Patent No. 201,254, dated March 12, 1878; application filed February 9, 1878.

*To all whom it may concern:*

Be it known that I, WILLIAM H. KRETSINGER, of Fort Madison, in the county of Lee and State of Iowa, have invented a new and valuable Improvement in Rakes; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a perspective view of my rake, and Fig. 2 is a perspective detail of the same.

My invention relates to metal garden or lawn rakes; and it consists in one or more braces connecting the rake with the handle, as will be hereinafter more fully set forth, and pointed out in the claim.

The annexed drawings, to which reference is made, fully illustrate my invention.

A represents the head, with teeth B B and shank C, of a metal garden or lawn rake. D is the handle, with ferrule E, and the shank C is inserted in said handle in the usual manner.

F F represent two braces, made of one piece, or connected at their inner or rear end, to lie on top of the handle D, and fastened thereto by a screw, *a*, or other suitable means. The outer ends of the braces F F are enlarged, and have holes or openings *b b* through them.

The connection is made with the rake by means of the hole or opening *b* made in the outer enlarged end of the brace, of a proper size for receiving one of the teeth B, and to be passed upward on the tooth until the end of the brace strikes the head A of the rake. This is designed to prevent the shank C of the rake from bending, breaking, or pulling out of the handle, and particularly to remove or relieve the strain and leverage from the shank, and to prevent its being bent or broken, as the size of the implement at the junction admits of only a small shank being welded to or connected with the head, and which, unsupported, leaves the shank too weak for the service required of it.

Instead of a hole in the end of the brace, as shown, the two outer ends of the brace may be widened, as described, and a recess made on either side on the extreme end, of a width and depth to receive the tooth; or a hole with a side or end opening to receive the tooth could be made; or the ends made in the form of a hook, to embrace either the tooth or the head of the rake; or an outer or inner tip, or both, raised on the brace to partially clasp the head, or to go between two teeth, with a hook to clasp two teeth, one on each side of the end of the brace.

What I claim as new, and desire to secure by Letters Patent, is—

In combination with an ordinary metal garden or lawn rake, one or more braces fastened to the handle, and connecting with the rake proper by a hole or opening made in the outer end of the brace to receive a tooth, and lie close to the head, substantially as and for the purposes herein set forth.

In testimony that I claim the above I have hereunto subscribed my name in the presence of two witnesses.

WILLIAM H. KRETSINGER.

Witnesses:
 EKIN SMITH,
 B. F. HODGMAN.